(12) United States Patent
Griffin (10) Patent No.: US 9,625,936 B2
(45) Date of Patent: Apr. 18, 2017

(54) INTEGRATED SEAL FOR CONTROL BUTTON

(71) Applicant: Snap-on Incorporated, Kenosha, WI (US)

(72) Inventor: Paul W. Griffin, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 14/697,003

(22) Filed: Apr. 27, 2015

(65) Prior Publication Data

US 2016/0259363 A1    Sep. 8, 2016

Related U.S. Application Data

(63) Continuation of application No. 14/639,264, filed on Mar. 5, 2015.

(51) Int. Cl.
| | | |
|---|---|---|
| *H01H 13/06* | (2006.01) | |
| *G05G 25/04* | (2006.01) | |
| *G05G 1/02* | (2006.01) | |
| *H01H 13/86* | (2006.01) | |

(52) U.S. Cl.
CPC .............. *G05G 25/04* (2013.01); *G05G 1/02* (2013.01); *H01H 13/06* (2013.01); *H01H 13/86* (2013.01)

(58) Field of Classification Search
CPC .......................... H01H 13/06; H01H 2223/002
USPC ............................................ 200/302.1, 302.2
See application file for complete search history.

(56) References Cited

U.S. PATENT DOCUMENTS

| | | | |
|---|---|---|---|
| 3,974,351 A | | 8/1976 | Solov et al. |
| 4,417,113 A | * | 11/1983 | Saito .................... G04B 37/106 |
| | | | 200/302.2 |
| 4,755,645 A | | 7/1988 | Naoki et al. |
| 5,145,058 A | | 9/1992 | Lee |
| 5,308,943 A | | 5/1994 | Screven et al. |
| 5,545,865 A | * | 8/1996 | Gotou .................... H01H 13/14 |
| | | | 200/341 |
| 5,907,612 A | | 5/1999 | Aggus et al. |
| 6,483,057 B1 | * | 11/2002 | Wu ........................ H01H 13/06 |
| | | | 200/302.1 |
| 8,381,830 B2 | | 2/2013 | Puzio et al. |
| 2008/0251269 A1 | | 10/2008 | Hua |

(Continued)

FOREIGN PATENT DOCUMENTS

| | | |
|---|---|---|
| CN | 201498407 U | 6/2010 |
| CN | 102476367 A | 5/2012 |

(Continued)

OTHER PUBLICATIONS

UK Combined Search and Examination Report, dated Jun. 23, 2016; 8 pages.

(Continued)

*Primary Examiner* — Renee Luebke
*Assistant Examiner* — Ahmed Saeed
(74) *Attorney, Agent, or Firm* — Seyfarth Shaw LLP (57) ABSTRACT

A seal integrated into a groove of a button. The seal includes a cross-section with a peak surrounded by a valley on each side of the peak. The valleys both extend below the outer surface of the midsection of the button and the peak extends above the outer surface. This structure allows for easier compression of the seal while performing the sealing function.

13 Claims, 9 Drawing Sheets

(56) References Cited

U.S. PATENT DOCUMENTS

| | | | |
|---|---|---|---|
| 2009/0057123 A1 | 3/2009 | Yoshikawa | |
| 2011/0024271 A1 | 2/2011 | Zanini et al. | |
| 2012/0044623 A1 | 2/2012 | Rivera et al. | |
| 2012/0266971 A1* | 10/2012 | Nourian | F16L 55/1108 137/15.08 |
| 2014/0144762 A1* | 5/2014 | Cheong | H01H 13/06 200/302.2 |
| 2014/0233359 A1* | 8/2014 | Ishida | G04B 37/106 368/290 |

FOREIGN PATENT DOCUMENTS

| | | |
|---|---|---|
| CN | 203377143 U | 1/2014 |
| CN | 204144111 U | 2/2015 |
| DE | 3837636 A1 | 5/1990 |
| DE | 10157329 C1 | 3/2003 |
| EP | 2043119 A1 | 5/2013 |
| GB | 1218480 A | 6/1971 |
| GB | 2187891 B | 4/1989 |
| TW | 201009538 A | 3/2010 |
| TW | 201421464 A | 6/2014 |

OTHER PUBLICATIONS

UK Combined Search and Examination Report, dated Aug. 5, 2016; 7 pages.
China Patent Office, First Office Action dated Sep. 14, 2016; 12 pages.
Canadian Examiners Report, dated Sep. 30, 2016; 4 pages.
Australian Government Patent Examination Report No. 1, dated Mar. 11, 2016; 7 pages.
Australian Government Patent Examination Report No. 1, dated May 30, 2016; 7 pages.

* cited by examiner

INTEGRATED SEAL FOR CONTROL BUTTON

CROSS-REFERENCE TO RELATED APPLICATIONS

This application is a continuation-in-part of U.S. patent application Ser. No. 14/639,264, filed Mar. 5, 2015, the contents of which are incorporated herein by reference in its entirety.

TECHNICAL FIELD OF THE INVENTION

The present invention relates generally to an integrated seal for a button. More particularly, the present invention relates to an integrated seal for a button that requires a smaller compressive force compared to an O-ring seal.

BACKGROUND OF THE INVENTION

Depressible buttons are used in many types of power tools. Examples of depressible buttons include triggers for initiating operation, reverse mechanisms that reverse the direction of operation of the tool, and power restriction buttons that limit the output of the tool. Each of these buttons must be maintained in a structurally stable configuration due to the repeated use of the buttons during each operation of the tool. A trigger for a drill, for example, may be used many times during a single drilling operation. Also, tools are commonly subjected to large internal stressing and flexing, causing some tool buttons to dislodge or unwantingly pop-out from the tool, if not properly secured.

Conventional tool buttons are typically installed in an intended permanent manner that limits removal of the buttons when replacement, repairing, or removal is required. For example, the tool buttons may be permanently coupled inside the tool or otherwise require complete disassembly of the tool to repair, replace or remove the tool button. Often times, when such buttons are removed, either the tool or the button can be damaged. Alternately, to facilitate future removal of the button, the button may be loosely installed in the tool, or otherwise lack the structural stability needed with a tool button.

Conventional tools include retention mechanisms for retaining buttons, but such retention mechanisms lack the required structural stability or make removing the button difficult. For example, conventional tools include buttons attached to a control interface through slots, cutouts, pins, hooks, or other such measures. These tool buttons permanently attach to internal structure within the tool housing and lack the ability to be removed and replaced with any relative ease.

Conventional tool buttons include O-rings as seals to prevent external matter from entering the tool housing and to prevent internal air, fluid, or lubricant from leaking from the tool. These O-rings typically have a circular cross-section and are coupled around a cylindrical shaft. The O-rings require a large compressive force to create the seal with the housing. The large compressive force increases friction on the button when the button is actuated, thus causing increased force to actuate the button, and ultimately reduces the long term structural stability of the button and seal.

SUMMARY OF THE INVENTION

Embodiments of the present invention include a seal integrated into a button in an annular groove disposed on the button. The seal has a cross-section having a peak surrounded by a valley on each side of the peak. The valleys both extend below the outer surface of the midsection of the button and the peak extends above the outer surface of the midsection. Accordingly, the peak provides the necessary sealing function, while the valleys allow the peak to expand to provide the sealing without requiring a significant compressive force.

An embodiment of the present invention broadly includes a button including a base, a midsection extending from the base, a groove defined within the midsection, and a seal extending around the groove. The seal can have a cross section with a peak surrounded by at least one valley.

Another embodiment includes a button having a base, a midsection extending from the base, a groove defined within the midsection and having surface area, and a seal extending around the groove. The seal contacts a substantial entirety of the surface area of the groove.

BRIEF DESCRIPTION OF THE DRAWINGS

For the purpose of facilitating an understanding of the invention, there are illustrated in the accompanying drawings embodiments thereof, from an inspection of which, when considered in connection with the following description, the invention, its construction and operation, and many of its advantages should be readily understood and appreciated.

DETAILED DESCRIPTION OF THE EMBODIMENTS

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated.

An embodiment of the present invention broadly comprises a seal that is integrated into a groove of a button. The seal can include a cross-section having a peak surrounded by a valley on each side of the peak. The valleys both extend below the outer surface of the midsection of the button and the peak extends above the outer surface so as to allow for easier compression of the seal while performing the sealing function.

It will be appreciated that while the present invention is discussed as applicable to a depressible or switchable button for a tool, the invention is equally applicable for any type of device that uses a button.

Figure 1:
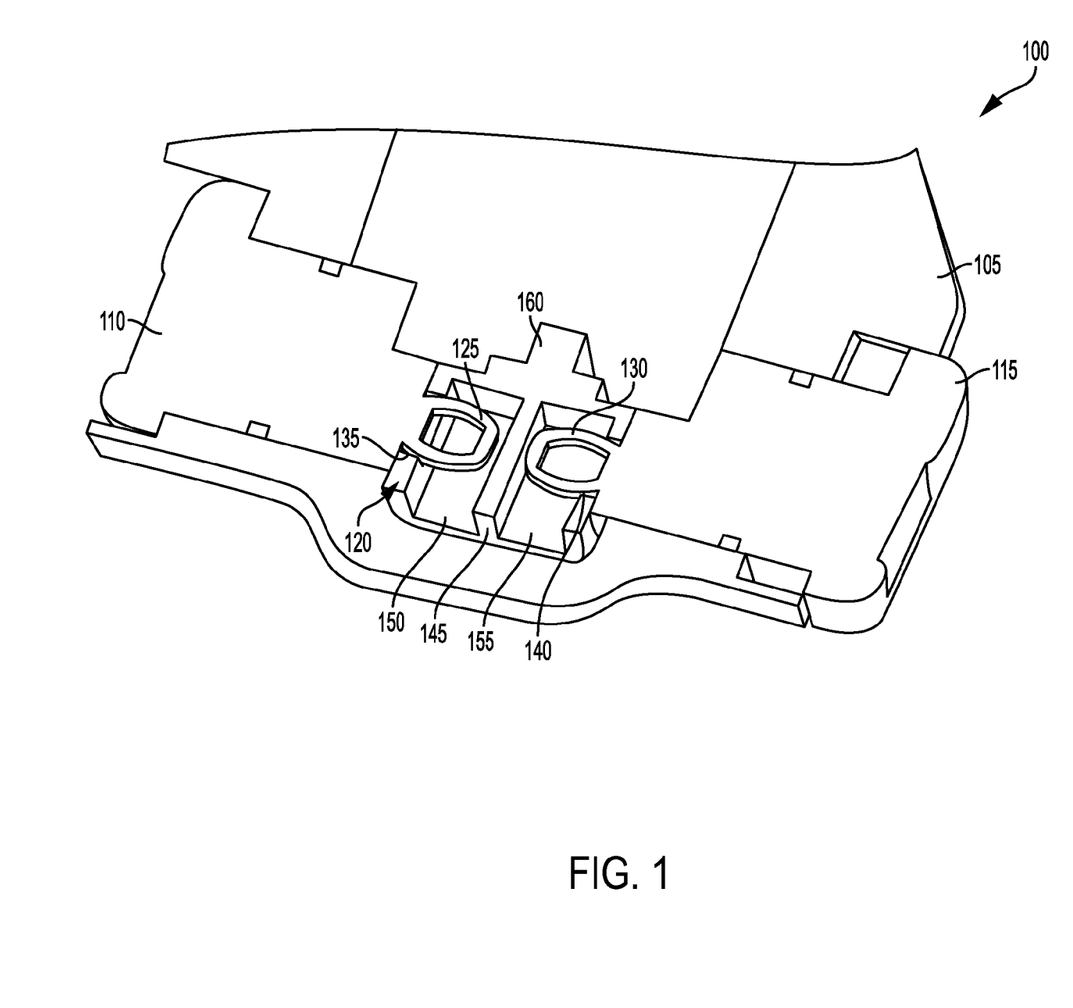
FIG. 1 is a cross section view through the device according to an embodiment of the present invention.
Figure 2:
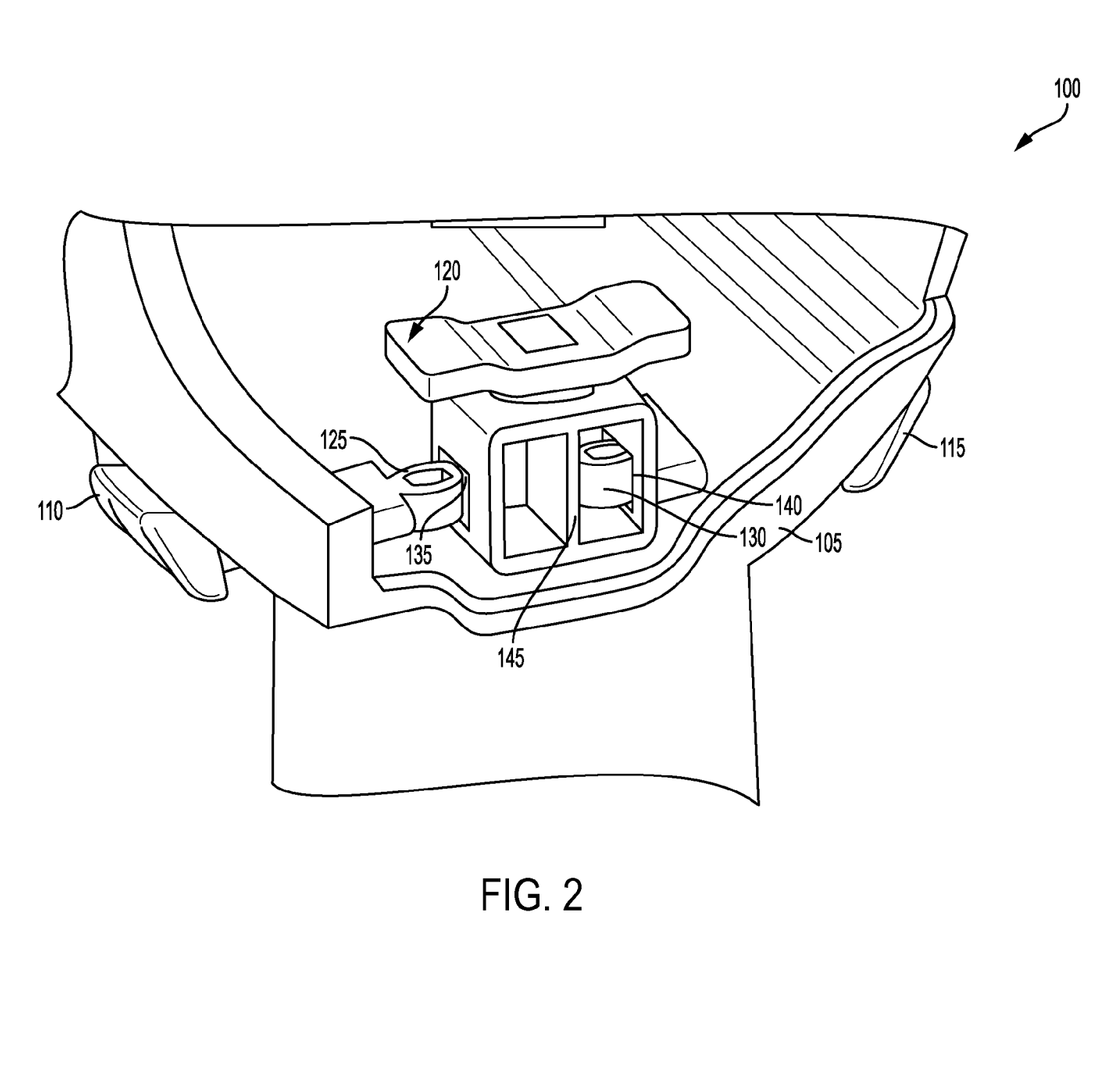
FIG. 2 is a partial cross section view of a first button being assembled into a first opening according to an embodiment of the present invention.
Figure 3:
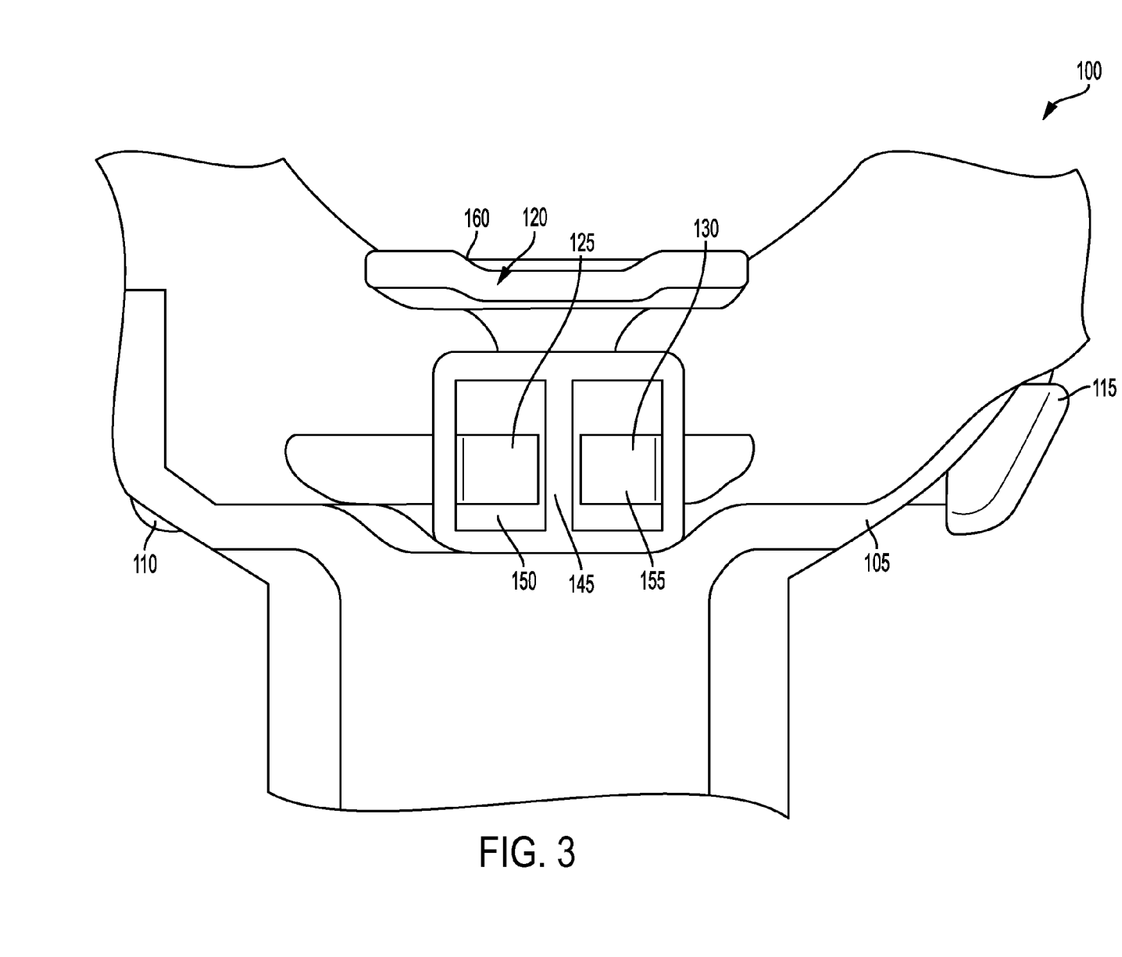
FIG. 3 is a front view of a tool according to an embodiment of the present invention.

Referring to FIGS. 1-3, the tool 100 includes a housing 105 adapted to allow a first button 110 and second button 115 to be depressibly coupled to a body 120 within the housing 105. The first and second buttons 110, 115 are operably coupled to the tool in a well-known manner. The first and second buttons 110, 115 can include respective first and second retention members 125, 130 that removably couple to the body 120 through, for example, a snap-fit or interference-fit. The first and second retention members 125, 130 can removably couple with the body 120 by being respectively inserted into first and second body openings 135, 140. The body 120 can further include a divider 145 that separates the body 120 and defines first and second windows 150, 155 facing a direction substantially perpendicular to the direction in which the first and second body openings 135, 140 face. The body 120 can further include an agitator 160 that operably couples the body 120 to the tool, such that when the body 120 is moved, it causes the tool 100 to perform an operation, for example, changing the direction of the tool 100 from forward to reverse.

The first and second buttons 110, 115 can extend through a passage in the housing 105 to be removable from the housing. In some embodiments, the first and second buttons 110, 115 are not permanently coupled within the housing, but respectively include first and second retention members 125, 130 that retain the first and second buttons 110, 115 on the body 120. For example, the first and second retention members 125, 130 can be snap-fit or interference-fit within the openings 135, 140 because a diameter or lateral dimension of the first and second retention members 125, 130 can be respectively larger than the diameter or lateral dimension of the respective first and second openings 135, 140. In other words, the first and second retention members 125, 130 can be respectively larger than the first and second openings 135, 140, requiring additional force to insert or remove the first and second retention member 125, 130 from the first and second openings 135, 140.

The first and second retention members 125, 130 can each be made of a flexible material and/or shaped to allow for flexing when respectively inserted into the first and second openings 135, 140. For example, as shown, the first and second retention members 125, 130 can each be flexible rings (or any other enclosed shape with a gap inside the enclosed shape) that flexes inwardly when respectively inserted into the first and second openings 135, 140, and flex outwardly after being completely respectively inserted through the first and second openings 135, 140. Thereafter, pulling either of the first and second buttons 110, 115 outwardly is substantially prevented by the snap-fit or interference-fit interface between the first and second retention members 125, 130 and the first and second openings 135, 140. The first and second retention members 125, 130 can also each be arcuate segments, rather than a full ring, or any other shape or structure that flexes when respectively inserted through the first and second openings 135, 140. This structure allows the first and second retention members 125, 130 to be inserted into the body 120 and snap-fit or interference-fit in the body 120 without requiring tools and without disassembling the tool 100. Further, the first and second retention member 125, 130 can each be removed with enough force to overcome the ramp forces caused by the snap-fit or interference-fit between the first and second retention members 125, 130 and the first and second openings 135, 140, but not removed during conventional use of the tool 100, which involves less force on the first and second buttons 110, 115. Accordingly, the first and second buttons 110, 115 can each be inserted and removed, and assembled into the tool 100 with structural stability, due to the respective fit interaction between the first and second retention members 125, 130 and the first and second openings 135, 140.

The first and second retention members 125, 130 can be respectively coupled to the body 120 via the first and second openings 135, 140, and can cause the body 120 and agitator 160 to move by actuation of the either of the first and second buttons 110, 115. For example, a user can push the first button 110 inwardly and cause immediate movement of the body 120 and agitator 160 because the first button 110 is coupled to the body 120 via the first retention member 125. Likewise, a user can push the second button 115 inwardly and cause immediate movement of the body 120 and agitator 160 because the second button 115 is coupled to the body 120 via the second retention member 130. Alternately, or in addition to the above, the first and second retention members 125, 130 can abut divider 145 and therefore push the body 120 when either of the first and second buttons 110, 115 is pushed inwardly. Using the example above, pushing the first button 110 inwardly not only pushes the body 120 due to the coupling between the first retention member 125 and first opening 135, but also due to the force exerted on the divider 145 by the first retention member 125. Likewise, pushing the second button 115 inwardly not only pushes the body 120 due to the coupling between the second retention member 130 and second opening 140, but also due to the force exerted on the divider 145 by the second retention member 135. It will be appreciated that by pushing either of the first and second buttons 110, 115 provides an immediate response from the body 120, and by extension, the agitator 160, causing the control operation to be executed immediately after the first or second button 110, 115 actuation.

The agitator 160 can be any shape or size to cause a control operation to occur. For example, the agitator 160 can be coupled to a reverse mechanism such that movement of the agitator 160 in an axial direction will switch the direction the tool 100 operates (e.g., from clockwise to counterclockwise rotational direction). The agitator 160 can be integral with or coupled to the body 120 such that movement of the body 120 causes movement of the agitator 160 and, by extension, causes the control operation to occur.

Figure 4:
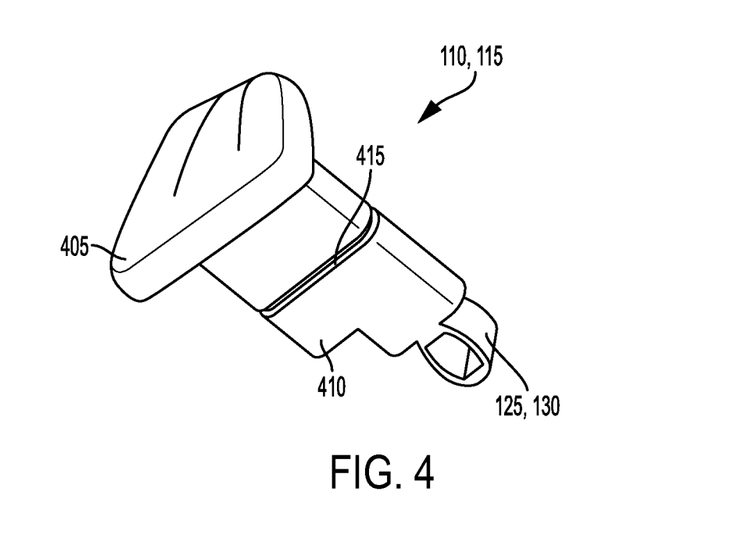
FIG. 4 is a front perspective view of a button according to an embodiment of the present invention.
Figure 5:
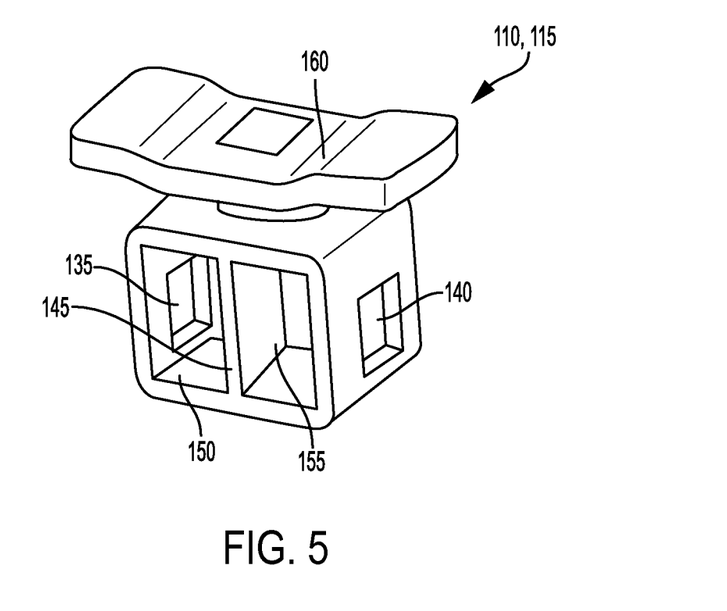
FIG. 5 is a front perspective view of a body according to an embodiment of the present invention.

Referring to FIG. 4, the first and second buttons 110, 115 respectively include first and second retention members 125, 130 that couple with the body 120 respectively through first and second openings 135, 140. As shown, the first and second buttons 110, 115 can also each include a button base 405, a button arm 410 extending from the button base 405, and a ridge 415 extending circumferentially around the button arm 410.

The button base 405 can act as an interface between a user and the tool 100 and is the point of physical contact for the user. Because of this, the button base 405 can include a textured surface to tactilely inform the user that the user is touching one of the first and second buttons 110, 115. This allows the user to actuate one of the first and second buttons 110, 115 without having to look at the first and second buttons 110, 115, but rather by feeling for the appropriate button. In some embodiments, the first button 110 has a different textured surface on the button base 405, compared to the surface of the second button 115, to tactilely differentiate for the user which of the first and second buttons 110, 115 is being touched.

The button arm 410 can extend from the button base 405 through a passage of the housing 105 to allow for easy removal, repair, or replacement of either of the first and second buttons 110, 115. Also, the ridge 415 can be disposed circumferentially around each of the first and second buttons 110, 115 at a location longitudinally inwardly from an inner wall of the housing 105 when the button body 405 is substantially flush against an external wall of the housing 105. The ridge 415 can provide a groove for an O-ring or other form of sealant to seal the housing 105 from oil and leakage. Alternately, the ridge 415 need not be implemented at all.

Figure 6:
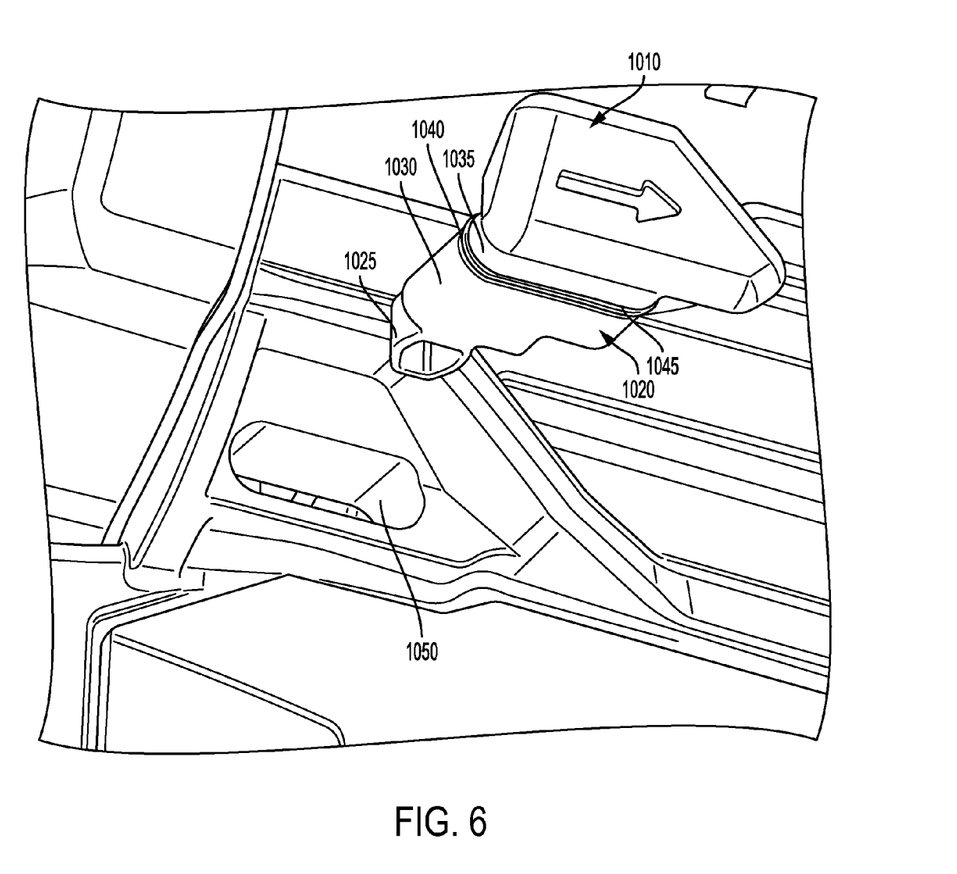
FIG. 6 is an exploded bottom perspective view of a button and tool housing according to an embodiment of the present invention.

Referring to FIG. 6, a button 1010 can include a midsection 1020 extending to a retention member 1025 that removably retains the button 1010 in, for example, the body 120. The midsection 1020 can include a first section 1030 and a second section 1035 separated by a groove 1040. The groove 1040 can extend around the midsection 1020 and receive a seal 1045. The button 1010 and seal 1045 can then be movably retained into a tunnel 1050 of the housing 105.

The midsection 1020 can be any shape and is not limited to a cylindrical or tubular shape. For example, the midsection 1020 can be a cylinder, tube, rectangular or other shaped prizm, oval prism or flattened cylinder, or any obscure shape. The tunnel 1050 of the housing 105 is preferably the same shape as the midsection 1020, but need not be an exact match to the midsection 1020. In an embodiment, the midsection includes the seal 1045 around the groove 1040, and the seal 1045 matingly engages the tunnel 1050 due to the similarities in shape between the midsection 1020 and tunnel 1050.

In an embodiment, the seal 1045 can be molded to the midsection 1020 at the groove 1040 and need not be a separate component to the midsection 1020. Molding the seal 1045 to the midsection 1020 is advantageous in that it requires only one tolerance to be met, i.e., the distance across the button 1010 over the seal 1045. When manufacturing the seal 1045 and midsection 1020 separately, two tolerances must be met—one for the button 1010 and groove 1040, and one for the seal 1045, so that the seal 1045 is sufficiently raised above the button 1010 but not excessively so. Molding the seal 1045 to the button 1010 avoids this dual-tolerance issue. Also, molding the seal 1045 to the button 1010 allows the groove 1040 to be any shape, including an undercut, where a conventional O-ring may have trouble maintaining its position.

Figure 7:
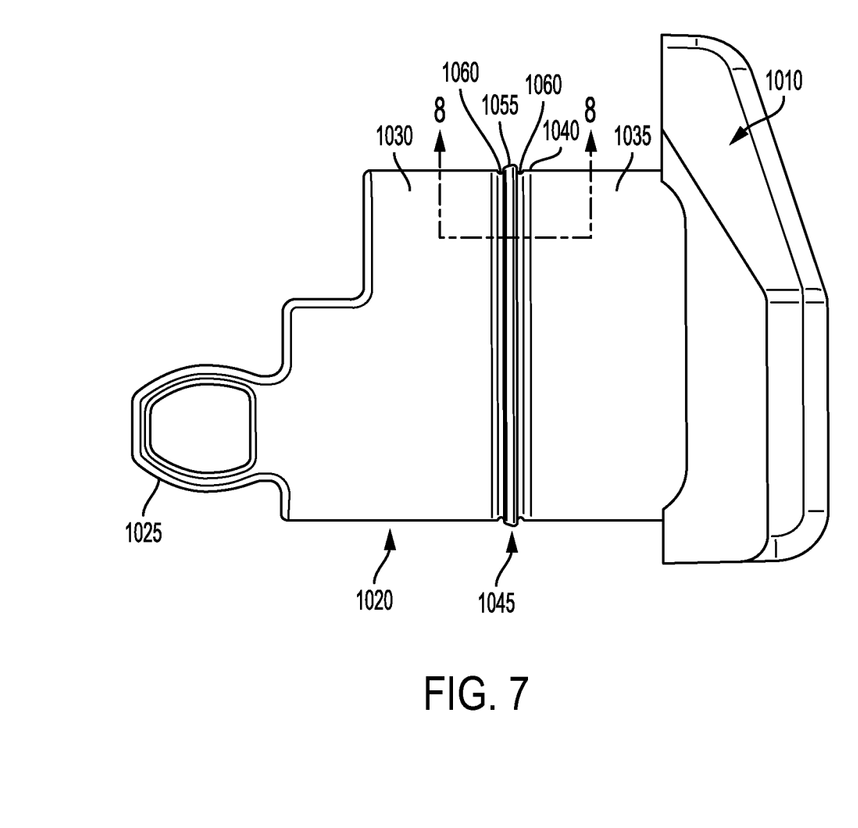
FIG. 7 is a side view of a button according to an embodiment of the present invention.
Figure 8:
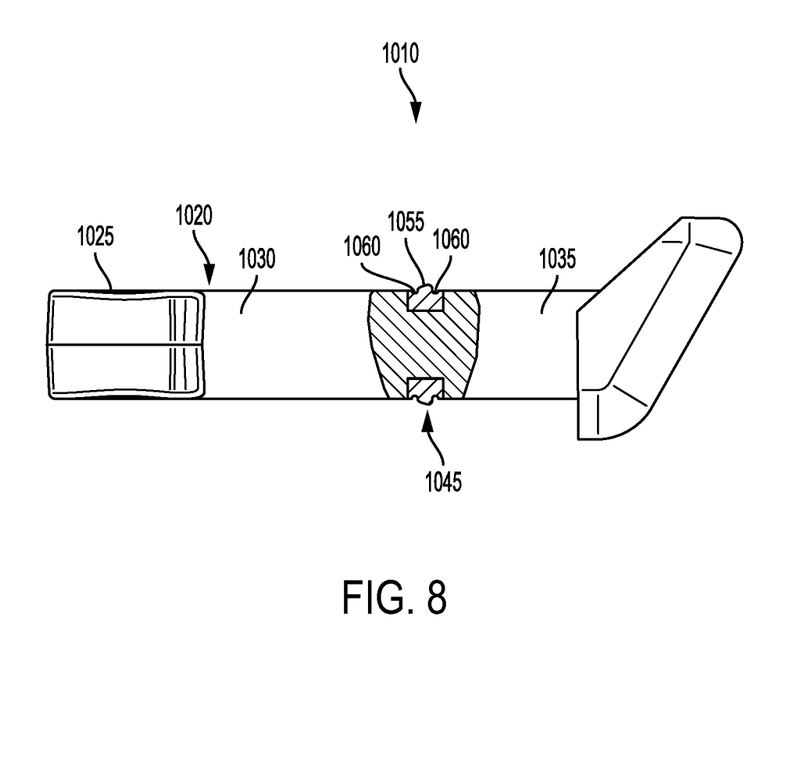
FIG. 8 is a side, partial cross-sectional view of the button of FIG. 7, taken along line 8-8 in FIG. 7, according to an embodiment of the present invention.
Figure 9:
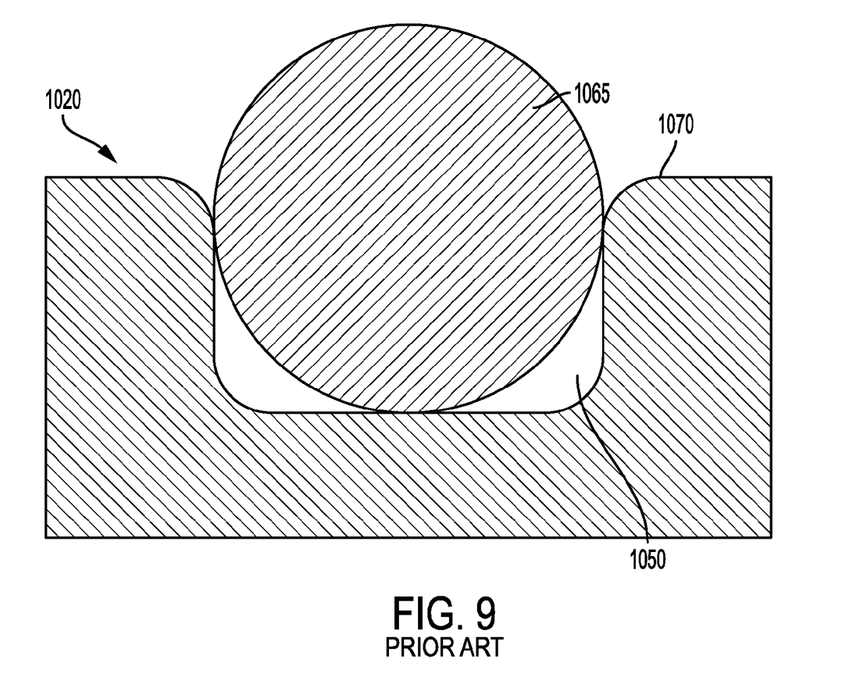
FIG. 9 is a side, cross-sectional view of a groove with an O-ring seal according to a prior art design.
Figure 10:
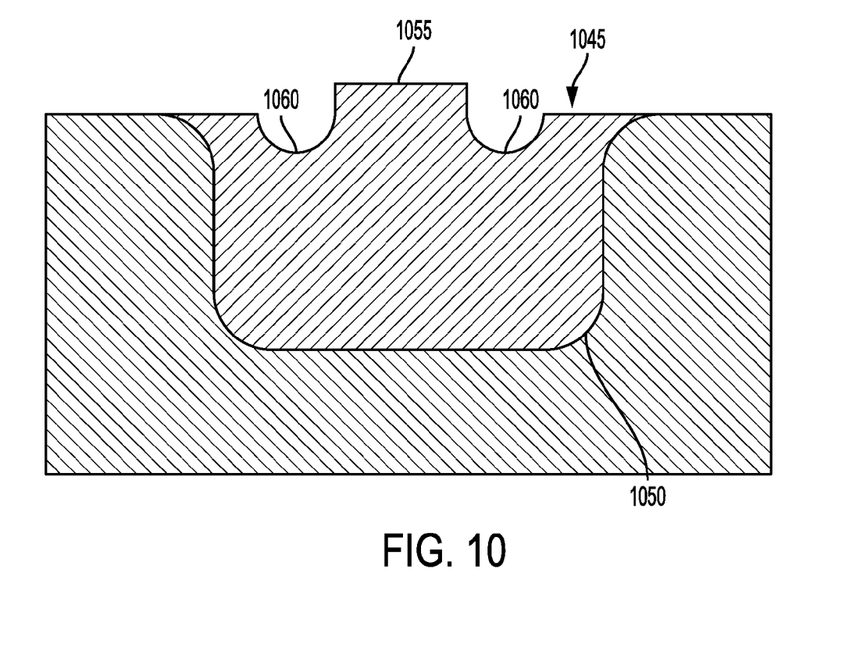
FIG. 10 is a side cross-sectional view of a groove with a peak-and-valley seal according to an embodiment of the present invention.

Referring also to FIG. 7, the seal 1045 can include a peak 1055 surrounded by at least one, and preferably two, valleys 1060. The number of peaks 1055 need not be one or two, and can be any number. Further, the peaks 1055 need not be symmetric and can be any shape. FIGS. 9 and 10 illustrate the difference between the conventional O-ring seal (FIG. 9), and the more versatile peak-and-valley seal (FIG. 10), in an embodiment of the present invention. The conventional seal can include an O-ring 1065 with a circular cross-section that extends partially above an outer surface 1070 of the midsection 1020. The circular cross section presents several problems. First, the circular cross section necessarily provides for gaps where air can escape the housing 105 via the button 1010. Second, the O-ring 1065 includes a large portion that extends above the outer surface 1070 of the midsection 1020. This large portion must be compressed for the button 1010 to move laterally within the tunnel 1050, providing additional friction when the button 1010 is actuated by a user.

Referring to FIG. 10, the seal 1045 includes a peak 1055 with two valleys 1060 on each side of the peak 1055. In some embodiments, the seal 1045 substantially fills the groove 1050 so that no gaps are present to allow for the leakage of air or lubricant from the housing 105. For example, the seal 1045 can contact the entirety of the surface area of the groove 1050 such that the seal 1045 substantially fills the groove 1050 except for the cross-sectional area represented by the valleys 1060.

The peak 1055 can provide a sealing effect by abutting the tunnel 1050 during operation of the button 1010. Although this provides some frictional drag when the button 1010 is actuated, the peak-and-valley seal provides less friction due to the structural configuration of the peak 1055 and valleys 1060. More particularly, the peak 1055 can extend above an outer surface 1070 of the midsection 1020 to abut the tunnel 1050 and provide the sealing effect. However, the valleys 1060 can extend below the outer surface 1070 and allow for the peak 1055 to compress into the valleys 1060. The valleys 1060 can have a curved cross-section to eliminate sharp angles where the compression or rotation of the peak 1055 can result in high-stress areas where failure could occur. Of course, the peak 1055 and valley 1060 can be any shape without departing from the spirit and scope of the present application.

By implementing valleys 1060 next to the peak 1055, the peak 1055 need not have as much mass located above the outer surface 1070 of the midsection 1020. Lessening this mass reduces the friction caused by a user actuating the button 1010. Further, because in some embodiments, the seal 1045 completely fills the tunnel 1050 except for the areas represented by the valleys 1060, the seal 1045 can advantageously fill any gaps that would otherwise exist with the O-ring seal shown in FIG. 9.

As discussed above, the tool 100 can be a power tool. However, the tool 100 can be any type of tool, such as a hand or power tool. For example, the tool 100 can be an impact wrench, drill, torque wrench, ratchet wrench, hammer, or any other tool. Moreover, the tool 100 need not be a tool at all, but rather any type of a device that includes a depressible button.

As used herein, the term "coupled" and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments of the present invention have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. A depressible button for a tool, comprising:
   a base;
   a midsection extending from the base and having an outer surface;

a groove disposed in and extending around the midsection; and a seal disposed in the groove and having a cross section with a peak and a valley adjacent the peak, wherein the peak extends beyond the outer surface and the valley extends below the outer surface.

2. The button of claim 1, wherein the valley includes a first valley on a first side of the peak, and a second valley on a second side of the peak.

3. The button of claim 1, wherein the seal substantially fills the groove in its entirety other than a cross-sectional area represented by the at least one valley.

4. The button of claim 1, wherein the midsection includes opposing first and second portions, and the groove is disposed between the first and second portions.

5. The button of claim 4, further comprising a retention member extending from the first portion, and wherein the base extends from the second portion.

6. The button of claim 5, wherein the retention member is an enclosed shape defining a gap within the enclosed shape.

7. A depressible button for a tool, comprising:

a base;

a midsection extending from the base and having an outer surface; and a seal extending around the midsection and having a cross section with a peak and a valley adjacent the peak, wherein the peak extends beyond the outer surface and the valley extends below the outer surface.

8. The button of claim 7, wherein the valley includes a first valley on a first side of the peak, and a second valley on a second side of the peak.

9. The button of claim 7, wherein the button includes first and second portions, and the seal is between the first and second portions.

10. The button of claim 9, further comprising a retention member extending from the first portion, and wherein the base extends from the second portion.

11. The button of claim 10, wherein the retention member is an enclosed shape defining a gap within the enclosed shape.

12. A depressible button for a tool, comprising:

a base;

a midsection extending from the base and having first and second portions;

a groove disposed in and extending around the midsection between the first and second portions;

a seal disposed in the groove and having a cross section with a peak and a valley adjacent the peak; and a retention member extending from the first portion and having an enclosed shape defining a gap within the enclosed shape, and wherein the base extends from the second portion.

13. A depressible button for a tool, comprising:

a base;

a midsection extending from the base and having first and second portions;

a seal extending around the midsection between the first and second portions, the seal having a cross section with a peak and a valley adjacent the peak; and a retention member extending from the first portion and having an enclosed shape defining a gap within the enclosed shape, and wherein the base extends from the second portion.

\* \* \* \* \*